(12) United States Patent
Abad et al.

(10) Patent No.: US 10,737,531 B2
(45) Date of Patent: Aug. 11, 2020

(54) RUBBER COMPOSITION COMPRISING AN ESSENTIALLY SPHERICAL, RELATIVELY UNSTRUCTURED SILICA

(71) Applicant: COMPAGNIE GENERALE DES ETABLISSEMENTS MICHELIN, Clermont-Ferrand (FR)

(72) Inventors: Vincent Abad, Clermont-Ferrand (FR); Baptiste Foglieni, Clermont-Ferrand (FR); Flora Descombes, Clermont-Ferrand (FR); Salvatore Pagano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 125 days.

(21) Appl. No.: 16/070,167

(22) PCT Filed: Feb. 10, 2017

(86) PCT No.: PCT/FR2017/050312
§ 371 (c)(1),
(2) Date: Jul. 13, 2018

(87) PCT Pub. No.: WO2017/137711
PCT Pub. Date: Aug. 17, 2017

(65) Prior Publication Data
US 2019/0030953 A1 Jan. 31, 2019

(30) Foreign Application Priority Data
Feb. 12, 2016 (FR) ...................................... 16 51141

(51) Int. Cl.
| | | |
|---|---|---|
| *B60C 1/00* | (2006.01) | |
| *C08K 3/36* | (2006.01) | |
| *C08K 3/04* | (2006.01) | |
| *C08K 5/09* | (2006.01) | |
| *C08L 7/00* | (2006.01) | |
| *C08L 9/00* | (2006.01) | |

(52) U.S. Cl.
CPC .............. *B60C 1/0016* (2013.01); *B60C 1/00* (2013.01); *B60C 1/0025* (2013.01); *B60C 1/0041* (2013.01); *C08K 3/04* (2013.01); *C08K 3/36* (2013.01); *C08K 5/09* (2013.01); *C08L 7/00* (2013.01); *C08L 9/00* (2013.01); *B60C 2001/0066* (2013.01); *B60C 2001/0083* (2013.01); *C08K 2201/006* (2013.01); *C08K 2201/011* (2013.01); *C08K 2201/016* (2013.01); *C08L 2312/00* (2013.01)

(58) Field of Classification Search
CPC .... C08K 3/36; C08K 3/04; C08K 5/09; C08L 7/00; C08L 9/00; B60C 1/0016; B60C 1/0025; B60C 1/00

USPC ......................................................... 523/162
See application file for complete search history.

(56) References Cited

U.S. PATENT DOCUMENTS

| | | |
|---|---|---|
| 5,977,238 A | 11/1999 | Labauze |
| 6,013,718 A | 1/2000 | Cabioch et al. |
| 6,503,973 B2 | 1/2003 | Robert et al. |
| 6,774,255 B1 | 8/2004 | Tardivat et al. |
| 6,815,473 B2 | 11/2004 | Robert et al. |
| 6,849,754 B2 | 2/2005 | Deschler et al. |
| 2003/0114571 A1* | 6/2003 | Pan ...................... B60C 1/0016 524/492 |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2011/0152405 A1* | 6/2011 | Thomasson ........... B60C 1/0016 523/155 |
| 2011/0152434 A1 | 6/2011 | Schweitzer et al. |

FOREIGN PATENT DOCUMENTS

| | | |
|---|---|---|
| EP | 0 501 227 | 9/1992 |
| EP | 0 735 088 | 10/1996 |
| EP | 0 810 258 | 12/1997 |
| EP | 1 127 909 | 8/2001 |
| EP | 2 336 231 | 6/2011 |
| FR | 2 740 778 | 5/1997 |
| FR | 2 765 882 | 1/1999 |
| JP | 2009-29884 | * 2/2009 |
| JP | 2009-029884 | 2/2009 |
| JP | 2009-029884 | 2/2019 |
| WO | WO 97/36724 | 10/1997 |
| WO | WO 99/09036 | 2/1999 |
| WO | WO 99/16600 | 4/1999 |
| WO | WO 99/28376 | 6/1999 |
| WO | WO 00/73372 | 12/2000 |
| WO | WO 01/92402 | 12/2001 |
| WO | WO 02/10269 | 2/2002 |
| WO | WO 02/053634 | 7/2002 |
| WO | WO 03/016837 | 2/2003 |
| WO | WO 2004/003067 | 1/2004 |

(Continued)

OTHER PUBLICATIONS

Machine translation of JP 2009-29884 (Year: 2009).*

(Continued)

*Primary Examiner* — Doris L Lee
(74) *Attorney, Agent, or Firm* — Cozen O'Connor (57) ABSTRACT

A rubber composition based on one or more diene elastomer(s), on at least one reinforcing filler, on at least one coupling agent, on at least one chemical crosslinking system, wherein the reinforcing filler comprises silica in the form of essentially spherical nanoparticles, the specific surface area of this silica ranging from 30 m$^2$/g to 250 m$^2$/g. Also disclosed is a process for producing such a composition and also semi-finished or finished articles comprising at least one such composition.

21 Claims, 1 Drawing Sheet

(56) References Cited

FOREIGN PATENT DOCUMENTS

| WO | WO 2004/056915 | 7/2004 |
|---|---|---|
| WO | WO 2004/096865 | 11/2004 |
| WO | WO 2006/023815 | 3/2006 |
| WO | WO 2006/069792 | 7/2006 |
| WO | WO 2006/069793 | 7/2006 |
| WO | WO 2006/125532 | 11/2006 |
| WO | WO 2006/125533 | 11/2006 |
| WO | WO 2006/125534 | 11/2006 |
| WO | WO 2007/098080 | 8/2007 |
| WO | WO 2008/003434 | 1/2008 |
| WO | WO 2008/003435 | 1/2008 |
| WO | WO 2008/141702 | 11/2008 |
| WO | WO 2009/000750 | 12/2008 |
| WO | WO 2009/000752 | 12/2008 |
| WO | WO 2010/072761 | 7/2010 |
| WO | WO 2011/042507 | 4/2011 |
| WO | WO 2012/069585 | 5/2012 |
| WO | WO 2015/097195 | 7/2015 |

OTHER PUBLICATIONS

L. Tadiello et al., "The filler-rubber interface in styrene butadiene nanocomposites with anisotropic silica particles: Morphology and dynamic properties", Soft Matter, vol. 11, No. 20, pp. 4022-2033 May 28, 2015.

R. Scotti et al., "Shape controlled spherical (OD) and rod-like (1D) silica nanoparticles in silica/styrene butadiene rubber nanocomposites: Role of the particle morphology on the filler reinforcing effect", Polymer, vol. 55, No. 6, pp. 1497-1506, Jan. 31, 2014.

W. Stoeber et al., Controlled Growth of Monodisperse Silica Spheres in the Micron Size Range[1], Journal of Colloid Interface Science, 26,62-69 (1968).

Silica (Amorphous), Encyclopedia of Chemical Technology, fourth edition, vol. 21 p. 1027-1028.

H. Wadell, "Volume, Shape and Roundness of Quartz Particles", The Journal of Geology, vol. 43, No. 3, May 1935, pp. 250-280, The University of Chicago Press http://www.jstor.org/stable/30056250.

S. Otto, "Testing and Measuring, New Reference Value for the Description of Filler Dispersion with the Dispergrader 1000 NT", KGK Kautschuk Gummi Kunststoffe 58, Jahrgang, No. 7-8/2005, pp. 390-393.

* cited by examiner

RUBBER COMPOSITION COMPRISING AN ESSENTIALLY SPHERICAL, RELATIVELY UNSTRUCTURED SILICA

RELATED APPLICATIONS

This is a U.S. National Phase Application under 35 USC 371 of International Application PCT/FR2017/050312 filed on Feb. 10, 2017.

This application claims the priority of French application no. 1651141 filed Feb. 12, 2016, the entire content of which is hereby incorporated by reference.

FIELD OF THE INVENTION

The present invention relates to the field of diene rubber compositions reinforced by an inorganic filler, intended for the manufacture of finished or semi-finished products for tires, in particular of treads of these tires.

BACKGROUND OF THE INVENTION

Since fuel savings and the need to protect the environment have become a priority, it has proved necessary to produce semi-finished products, especially treads, for tires, having a reduced rolling resistance without adversely affecting other performance properties, such as wear resistance.

In addition, tire safety regulations are increasingly encouraging manufacturers to offer semi-finished products and tires that afford improved grip on roads in dry or wet conditions.

To achieve these aims of reducing the rolling resistance and the wear resistance while retaining good wet and dry grip, numerous solutions have already been tested. In particular, manufacturers have developed compositions for treads in which the carbon black was replaced by a particular precipitated silica. Indeed, some silicas have been identified as being particularly efficient for achieving these aims. These silicas have a BET specific surface area of between 100 and 250 $m^2/g$ and are termed "highly dispersible" (HD), or "highly dispersible silica" (HDS). They are used in tires with low rolling resistance, sometimes termed "green tires" in reference to the energy saving afforded to the user. As an example of such silicas, mention may especially be made of the Ultrasil 7000 silicas from Evonik, the Zeosil 1165 MP silica with a BET specific surface area approximately equal to 160 $m^2/g$ and sold by Solvay, the Zeosil 1135 MP and Zeosil 1115 MP silicas from Solvay, the Hi-Sil EZ150G silica from PPG, the Zeopol 8715, 8745 or 8755 silicas from Huber.

Another possibility for achieving these aims consists in formulating rubber compositions having large fractions by volume of reinforcing fillers and diluents, combined with synthetic elastomers.

For example, mention may be made of application WO2012/069585A1, by the Applicants, which describes compositions comprising high contents of fillers (100 to 150 phr) and a plasticizing system comprising a hydrocarbon-based resin and a plasticizing oil, the total content of plasticizers being of the order of 50 to 100 phr, with approximately 10 to 60 phr of oil and 10 to 60 phr of resin, these compositions making it possible to obtain good properties of wet grip without adversely affecting the rolling resistance. The reinforcing filler used in these compositions is a precipitated silica with a specific surface area of greater than 100 $m^2/g$.

Application EP2336231A1 describes rubber compositions based on a diene elastomer and comprising a system of reinforcing fillers consisting of carbon black, 10 to 80 phr of a highly structured precipitated silica, and 10 to 70 phr of a relatively unstructured silica in spherical form. The highly structured porous silica has a BET specific surface area ranging from 45 to 550 $m^2/g$ and the relatively unstructured silica has a BET specific surface area ranging from 15 to 25 $m^2/g$. The mean size of the relatively unstructured silica particles is 150 nm. These compositions, compared to a composition comprising a mixture of carbon black and a highly structured precipitated silica, have a good rolling resistance property but variable wear resistance properties.

Nonetheless, manufacturers are always seeking novel solutions to continue to improve the performance properties of compositions for tires and especially the rolling resistance, grip, wear, etc.

SUMMARY OF THE INVENTION

One object of the present invention is that of further improving the compromise between the properties of rolling resistance and of wear resistance of a rubber composition for a semi-finished product.

The inventors found, surprisingly, in the course of their research, that a silica in the form of essentially spherical nanoparticles and having a BET specific surface area ranging from 30 $m^2/g$ to 250 $m^2/g$, used as reinforcing filler, has an ability to reinforce the properties of an elastomer in a comparable, or even superior, way to a highly dispersible precipitated silica. Said silica in the form of essentially spherical nanoparticles has a good ability to be incorporated and dispersed in the elastomer matrix during the mixing thereof.

Another advantage of the composition according to an embodiment of the invention is that it may be used with very low contents of zinc, while avoiding the phenomenon of scorching.

An advantage of the rubber composition according to the invention is that it has an improved compromise of rolling resistance/wear resistance.

Another advantage of the composition according to the invention is that it has an improved compromise of rolling resistance/wear resistance, while also retaining good properties of grip, especially on roads in dry or wet conditions.

Another advantage of the composition according to an embodiment of the invention is that it may be used with very low contents of zinc, while avoiding the phenomenon of scorching.

Scorching is a phenomenon which rapidly results, during the preparation of the rubber competitions in an internal mixer, in premature vulcanizations causing very high viscosities in the raw state, which corresponds to obtaining rubber compositions which are extremely difficult to work and to process industrially.

Thus, one aspect of the present invention is directed to a rubber composition based on one or more diene elastomer(s), on at least one reinforcing filler, on at least one coupling agent, on at least one chemical crosslinking system, wherein the reinforcing filler comprises silica in the form of essentially spherical nanoparticles, the BET specific surface area of this silica ranging from 30 $m^2/g$ to 250 $m^2/g$.

Preferentially, the BET specific surface area of this silica may range from 30 to 150 $m^2/g$, even more preferably from 30 to 120 $m^2/g$, better still from 30 to 100 $m^2/g$.

Preferentially, the silica in the form of essentially spherical nanoparticles has a number of silanol groups per $nm^2$ of greater than or equal to 4, preferably ranging from 4 to 12, more preferably ranging from 5 to 10.

Preferentially, the silica in the form of essentially spherical nanoparticles has a sphericity index of greater than or equal to 0.80, preferably ranging from 0.80 to 0.99, more preferably ranging from 0.85 to 0.99.

Preferentially, the silica in the form of essentially spherical nanoparticles may be a fused silica.

Preferentially, the content of silica in the form of essentially spherical nanoparticles may range from 60 to 250 phr, preferably from 80 to 200 phr.

Preferentially, the median size of the essentially spherical silica nanoparticles may be less than or equal to 100 nm; it may preferably range from 10 to 80 nm, even more preferably may range from 20 to 70 nm.

Preferentially, the diene elastomer(s) may be selected from essentially unsaturated diene elastomers.

Preferably, the diene elastomer(s) may be selected from natural rubber, synthetic polyisoprenes, polybutadienes, butadiene copolymers, isoprene copolymers and the mixtures of these elastomers.

According to one embodiment, the composition may comprise from 50 to 100 phr of a first diene elastomer and optionally from 0 to 50 phr of a second diene elastomer different from the first diene elastomer.

According to a variant, the silica in the form of essentially spherical nanoparticles is the predominant reinforcing filler.

According to another variant, the weight of the silica in the form of essentially spherical nanoparticles represents more than 60%, preferably more than 90% of the total weight of reinforcing filler.

According to yet another variant, the reinforcing filler consists of silica in the form of essentially spherical nanoparticles.

According to yet another variant, the composition also comprises carbon black.

Preferentially, the total content of reinforcing filler(s) in the composition may range from 60 to 300 phr and preferably may range from 80 to 250 phr.

According to another embodiment, the composition also comprises from 10 to 220 phr of plasticizing agent selected from plasticizing resins having a glass transition temperature of greater than 20° C., plasticizers that are liquid at room temperature and mixtures thereof.

Preferentially, in the composition as defined above, the chemical crosslinking system is a vulcanization system which comprises sulfur, from 0 to 1 phr of zinc and from 0 to 1 phr of fatty acid, especially a fatty acid comprising from 16 to 20 carbon atoms, such as for example stearic acid.

Preferentially, in the composition as defined above, the chemical crosslinking system is a vulcanization system which comprises sulfur, between 0 and 0.5 phr of zinc and between 0 and 0.5 phr of fatty acid, especially a fatty acid comprising from 16 to 20 carbon atoms, such as for example stearic acid.

Another aspect of the invention relates to a process for preparing a rubber composition, especially for the manufacture of tires, characterized in that it comprises at least the following steps:
incorporating, in the diene elastomer(s), during a first step, at least one reinforcing filler and at least one coupling agent, everything being kneaded thermomechanically, once or several times, until a maximum temperature of between 110° C. and 190° C. is reached, said reinforcing filler comprising silica in the form of essentially spherical nanoparticles, the BET specific surface area of this silica ranging from 30 m$^2$/g to 250 m$^2$/g;
subsequently incorporating, during a second step, a crosslinking system and kneading everything up to a maximum temperature of less than 110° C., preferentially of less than 80° C.

Another aspect of the invention relates to a semi-finished rubber article for a tire which comprises at least one crosslinkable or crosslinked rubber composition as defined above or able to be obtained according to the process defined above. Preferably, the semi-finished article may be a tread.

Another aspect of the invention also relates to a tire which comprises at least one semi-finished article as defined above.

I. Measurements and Tests Used

I.1 Characterization of the Silica

I.1.1. Measurement of the BET Specific Surface Area:

The BET specific surface area is determined by gas adsorption using the Brunauer-Emmett-Teller method described in "The Journal of the American Chemical Society", Vol. 60, page 309, February 1938, more specifically, according to French Standard NF ISO 9277 of December 1996 [multipoint (5 point) volumetric method-gas: nitrogen-degassing: 1 hour at 160° C.-p/po relative pressure range: 0.05 to 0.17].

I.1.2. Measurement of the Sphericity Index and the Median Size of the Nanoparticles:

The sphericity index and the median size of the nanoparticles are determined by virtue of a method using transmission electron microscopy (TEM).

The sphericity index is determined by the ratio of the projected surface area (A) of a silica nanoparticle to the surface area of the disc (B) having the same circumference as the projected perimeter of said nanoparticle.

Circumferential perimeter=$2\pi r$=PM→r=PM/$2\pi$

Corresponding surface area=$\pi r^2$

Recalculated surface area (B)→B=$\pi$(PM/$2\pi$)$^2$=PM$^2$/$4\pi$

The sphericity index is defined as follows: Is=A/B=$4\pi$A/PM$^2$

This definition is a surface-area adaptation (in projection) of the sphericity index as described in the paper by Waldell and Hakon, "Volume, Shape and Roundness of Quartz particles" Journal of Geology, 43 (3) 250-280.

The median size of the nanoparticles corresponds to the size for which 50% by weight of the aggregates (nanoparticles) are smaller than this size and 50% by weight of the aggregates (nanoparticles) are larger than this size.

I.1.2.1. Preparation of the Sample:

The samples for observation were prepared according to a method which consists in dispersing from 2 to 10 mg of silica in 5 to 50 ml of ultrapure water by sonication with a probe with a power of 600 W for approximately 10 min A drop of 1 to 10 μl of the suspension obtained is deposited on a Carbon/Formvar grid (Ted Pella no. 01800-F, Support Films, 200Mesh Copper grids) which has been hydrophobized beforehand. The water in the deposited drop is evaporated in ambient air (temperature 23° C.) for at least 2 hours.

I.1.2.2. Observation:

The observations were conducted with a transmission electron microscope in bright field mode (TEM-BF) at an electron accelerating voltage of 200 kV. The images were acquired using a digital camera with a magnification giving a width of field of 4.495 μm to a height of 3.464 μm with a pixel size of 1.4 nm. Approximately 35 images were acquired in these conditions, which corresponds to an area covered of 545 μm$^2$.

I.1.2.3. Image Analysis:

In order to extract quantitative data from the images, image analysis was carried out using the CLEMEX Vision PE v7.0.553 analysis software (Clemex Technologies Inc.-Quebec). The 35 images were analysed using the following routine:

"Field
  001 Load Image '*.tif' with Bitplanes
  File: *.tif
  Use Default Calibration:If Required
  002 Median ×2
  003 Sharpen High
  004 Median ×2
  005 Grey Threshold
  BPL1 range 0.170
  Pause On All Fields
  006 Opening CIRC ×3⇒BPL1 Extend
  007 Separate CIRC⇒BPL1
  008 Object Transfer BPL1→BPL2
  Sphericity less than 0.8
  009 Object Transfer BPL1→BPL3
  Circular Diameter less than 0.025 μm
  010 Border Transfer BPL1 (All)→Recycle bin
  012 Object Measures (BPL1)→OBJM2
  ₁Aspect Ratio
  ₁Roundness
  ₁Sphericity
  ₁Fractal Dimension
  ₁Perimeter
  ₁Circular Diameter"

Aside from the conventional steps of image analysis by noise reduction (median) and contrast enhancement (sharpen), this routine focuses only on nanoparticles by:

Using a separation algorithm (separate CIRC)

Sorting based on the most spherical objects (sphericity index>0.8 retained)

Sorting based on object sizes (circular diameter>25 nm retained)

Sorting based on the objects touching the edges of the image, by eliminating same.

Under these conditions, the analysis is carried out on more than 10 000 objects. The software extracts the object size distribution, the median size and the sphericity index as a function of their respective size.

I.1.3. Number of Silanol Groups Per nm² :

The number of silanol groups per nm² is determined by grafting methanol onto the surface of the silica. Firstly, an amount of approximately 1 g of crude silica is suspended in 10 ml of methanol in a 110 ml autoclave.

A magnetic bar is introduced and the reactor, hermetically and heat sealed, is heated to 200° C. (40 bar) on a heated magnetic stirrer for 4 hours. The autoclave is then cooled in a bath of cold water. The grafted silica is recovered by decantation and the residual methanol is evaporated off under a stream of nitrogen. Finally, the grafted silica is dried at 130° C. under vacuum for 12 hours. The carbon content is determined by elemental analysis (NCS 250 analyzer from CE Instruments) on the crude silica and on the grafted silica. This carbon assay on the grafted silica must be performed within 3 days of the end of drying. This is because atmospheric moisture or heat may bring about hydrolysis of the methanol grafting.

The number of silanol groups per nm² is calculated by the following formula (I):

$$N_{SiOH/nm^2} = \frac{(\% \ C_g - \% \ C_b) * 6.023 * 10^{23}}{S_{Spe} * 10^{18} * 12 * 100} \quad (I)$$

in which:

$N_{SiOH/nm^2}$ represents the number of silanol groups per nm² ($SiOH/nm^2$);

% $C_g$ represents the percentage by weight of carbon present on the grafted silica;

% $C_b$ represents the percentage by weight of carbon present on the crude silica; and $S_{Spe}$ represents the BET specific surface area of the silica, in $m^2/g$.

I.1.4. Dispersion:

In a known way, the dispersion of filler in an elastomer matrix can be represented by the Z score (also referred to as dispergrader score), which is measured, after crosslinking, according to the method described by S. Otto et al. in Kautschuk Gummi Kunststoffe, 58 Edition, NR 7-8/2005, in accordance with standard ISO 11345.

The calculation of the Z score is based on the percentage of surface area in which the filler is not dispersed ("% undispersed surface area"), as measured by the "disperGRADER+" device supplied, with its operating instructions and "disperDATA" operating software, by Dynisco, according to the equation:

$$Z = 100 - (\% \ \text{undispersed surface area})/0.35$$

The percentage of undispersed surface area is, for its part, measured by virtue of a camera which observes the surface of the sample under incident light at 30°. The light points are associated with filler and agglomerates, whereas the dark points are associated with the rubber matrix; digital processing converts the image into a black and white image, and allows the percentage of undispersed surface area to be determined, as described by S. Otto in the abovementioned document.

The higher the Z score, expressed as a percentage, the better the dispersion of the filler in the elastomer matrix (a Z score of 100% corresponding to a perfect dispersion and a Z score of 0% to a mediocre dispersion). A Z value of greater than or equal to 80% will be deemed to correspond to a very good dispersion of the filler in the elastomer matrix.

I.2 Characterization of the Rubber Compositions

The rubber compositions were produced as described above and are characterized, before and after curing, as indicated below.

I.2.1. Tensile Tests:

These tensile tests make it possible to determine the elasticity stresses and the properties at break. Unless otherwise indicated, they are carried out in accordance with French Standard NF ISO37 of December 2005.

The stresses at break (in MPa) and the elongations at break (in %) are measured under standard conditions of temperature (23° C.±2° C.) and of relative humidity (50±10% relative humidity). Processing the tensile recordings also makes it possible to plot the curve of modulus as a function of the elongation.

I.2.2. Dynamic Properties:

The dynamic property tan(δ)max is measured on a viscosity analyser (Metravib VA4000) according to Standard ASTM D 5992-96. The response of a sample of vulcanized composition (cylindrical test specimen with a thickness of 4 mm and a cross section of 400 mm²), subjected to a simple alternating sinusoidal shear stress, at a frequency of 10 Hz, under the standard temperature conditions (23° C.) according to Standard ASTM D 1349-99, is recorded. A peak-to-peak strain amplitude sweep is carried out from 0.1% to 50% (outward cycle) and then from 50% to 1% (return cycle). The result made use of is the loss factor (tan δ). For the return cycle, the maximum value of tan δ observed (tan(δ) max) is indicated.

The response of a sample of vulcanized composition subjected to a simple alternating sinusoidal shear stress during a temperature sweep, subjected to an imposed sinusoidal stress of 0.7 MPa and at a frequency of 10 Hz, at a temperature of 60° C., is also recorded, and the complex dynamic shear modulus (G*) at 60° C. is measured.

I.2.3. Scorch Time:

The measurements are carried out at 130° C., in accordance with French Standard NF T 43-005 of 1991. The change in the consistometric index as a function of time makes it possible to determine the scorch time of the rubber compositions, assessed in accordance with the abovementioned standard, by the parameter T5 (case of a large rotor), expressed in minutes, and defined as being the time in minutes necessary to obtain an increase in the consistometric index (expressed in MU) of 5 units above the minimum value measured for this index.

I.3 Characterization of the Tires or Treads:

I. 3.1. Rolling Resistance:

The rolling resistance is measured on a flywheel, according to the ISO 87-67 (1992) method. A value greater than that of the control, arbitrarily set at 100, indicates an improved result, that is to say a lower rolling resistance.

I.3.2. Wear Resistance:

The method used for measuring the wear resistance is based on the comparison of the residual tread pattern heights between a control tire (tire PT0) and a tire in accordance with the invention (tire PC1) after 4000 km of running on an open road covering both urban driving and winding routes. A value greater than that of the control, arbitrarily set at 100, indicates an improved result, that is to say a better wear resistance.

I.3.3. Dry Grip: Braking on Dry Ground

The tires are fitted to a motor vehicle equipped with an ABS braking system and the distance required to go from 100 km/h to 0 km/h is measured during sudden braking on dry ground (asphalt concrete). A value greater than that of the control, arbitrarily set at 100, indicates an improved result, that is to say a shorter braking distance, thereby reflecting better grip.

III. DETAILED DESCRIPTION OF THE SINGLE DRAWING

Figure 1:
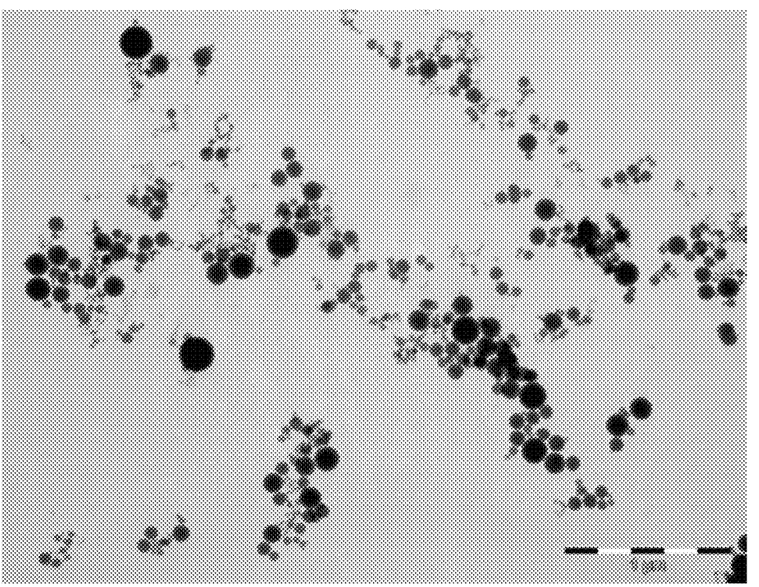
FIG. 1 represents a transmission electron micrograph (TEM) of a silica in the form of essentially spherical nanoparticles. The sample is prepared according to the procedure described in paragraph I.1.2.1 and the micrograph is obtained according to the procedure described in paragraphs I.1.2.2. and I.1.2.3. The scale in μm is indicated in FIG. 1.

The rubber compositions according to the invention are based on one or more diene elastomer(s), on at least one reinforcing filler, on at least one coupling agent, on at least one chemical crosslinking system, wherein the reinforcing filler comprises silica in the form of essentially spherical nanoparticles, the BET specific surface area of this silica ranging from 30 m²/g to 250 m²/g.

The expression "composition based on" is intended to mean a composition comprising the mixture and/or the product of the in situ reaction of the various constituents used, some of these constituents being able to, and/or intended to, react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight.

Furthermore, any range of values denoted by the expression "between a and b" represents the range of values extending from more than "a" to less than "b" (that is to say, limits a and b excluded), while any range of values denoted by the expression "from a to b" means the range of values extending from "a" up to "b" (that is to say, including the strict limits a and b).

The abbreviation "phr" (per hundred parts of rubber) means parts by weight per hundred parts of elastomers (of the total of the elastomers, if several elastomers are present) or rubber present in the rubber composition.

The term "predominantly" or "predominant" is intended to mean, for the purposes of the present invention, that the compound is predominant among the compounds of the same type in the composition, that is to say that it is the one which represents the greatest amount by weight or by mass among the compounds of the same type. In other words, the weight of this compound represents at least 51% of the total weight of the compounds of the same type in the composition. By way of example, a "predominant" reinforcing filler is the reinforcing filler representing the greatest weight relative to the total weight of the reinforcing fillers in the composition. In other words, the weight of this reinforcing filler represents at least 51% of the total weight of the reinforcing fillers in the composition.

"Fatty acid" is intended to mean, for the purposes of the present invention, a carboxylic acid comprising a long, especially saturated or unsaturated, carbon-based chain. Preferentially, the fatty acid comprises from 14 to 28 carbon atoms and is especially saturated. More preferentially, the fatty acid comprises from 16 to 20 carbon atoms; more preferentially still, the fatty acid is stearic acid.

Within the context of the invention, the compounds, the reagents and other components mentioned in the description may be of fossil or biobased origin. In the latter case, they may partially or completely result from biomass or be obtained from renewable starting materials resulting from biomass. This regards especially monomers, polymers, plasticizers, fillers, etc.

III.1. Elastomer

The compositions according to the invention comprise one or more diene elastomers.

The term "diene" elastomer (or, equally, rubber), whether natural or synthetic, should be understood in a known way to mean an elastomer consisting at least in part (i.e., a homopolymer or a copolymer) of diene monomer units (monomers bearing two conjugated or non-conjugated carbon-carbon double bonds).

Diene elastomers can be classified into two categories: "essentially unsaturated" or "essentially saturated". "Essentially unsaturated" is generally intended to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be termed "essentially saturated" diene elastomers (low or very low content, always less than 15%, of units of diene origin). In the category of "essentially unsaturated" diene elastomers, "highly unsaturated" diene elastomer is intended in particular to mean a diene elastomer having a content of units of diene origin (conjugated dienes) which is greater than 50%.

Given these definitions, "diene elastomer capable of being used in the compositions in accordance with the invention" is intended more particularly to mean:
  (a) any homopolymer of a conjugated diene monomer, especially any homopolymer obtained by polymerization of a conjugated diene monomer having from 4 to 12 carbon atoms;
  (b) any copolymer obtained by copolymerization of one or more conjugated dienes with one another or with one or more vinylaromatic compounds having from 8 to 20 carbon atoms;
  (c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidene norbornene or dicyclopentadiene;
  (d) a copolymer of isobutene and of isoprene (butyl rubber) and also the halogenated versions, in particular chlorinated or brominated versions, of this type of copolymer.

Although it applies to any type of diene elastomer, those skilled in the art will understand that the present invention is preferably employed with essentially unsaturated diene elastomers, in particular of the above type (a) or (b).

By way of conjugated dienes, the following are especially suitable: 1,3-butadiene, 2-methyl-1,3-butadiene, 2,3-di($C_1$-$C_5$ alkyl)-1,3-butadienes, such as, for example, 2, 3-dimethyl-1, 3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstirene, the "vinyltoluene" commercial mixture, para-(tert-butyl)stirene, methoxystirenes, chlorostirenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. For coupling to carbon black, mention may be made for example of functional groups comprising a C—Sn bond, or amino functional groups, such as aminobenzophenone, for example. Mention may be made, for example, for coupling to a reinforcing inorganic filler, such as a silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,5238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,5973, WO 2009/000750 and WO 2009/000752). As functional elastomers, mention may also be made of those prepared using a functional initiator, especially those bearing an amine or tin function (see, for example, WO 2010/072761). Mention may also be made, as other examples of functionalized elastomers, of elastomers (such as SBR, BR, NR or IR) of the epoxidized type.

These functionalized elastomers can be used as a blend (mixture) with one another or with non-functionalized elastomers. For example, it is possible to use a silanol- or polysiloxane-functionalized elastomer having a silanol end, as a mixture with an elastomer coupled and/or star-branched with tin (described in WO 2011/042507), the latter representing a content of 5% to 50%, for example of 25% to 50%.

The following are suitable: polybutadienes and in particular those having a content (mol %) of -1,2-units of between 4% and 80% or those having a content (mol %) of cis-1,4- of greater than 80%, polyisoprenes, butadiene/stirene copolymers and in particular those having a Tg (glass transition temperature, Tg, measured according to ASTM D3418) of between 0° C. and −70° C. and more particularly between −10° C. and −60° C., a stirene content of between 5% and 60% by weight and more particularly between 20% and 50% by weight relative to the weight of the copolymer, a content (mol %) of 1,2-bonds of the butadiene part of between 4% and 75% and a content (mol %) of trans-1,4-bonds of the butadiene part of between 10% and 80%, butadiene/isoprene copolymers and especially those having an isoprene content of between 5% and 90% by weight relative to the weight of the copolymer and a Tg of −40° C. to −80° C., or isoprene/stirene copolymers and especially those having a stirene content of between 5% and 50% by weight relative to the weight of the copolymer and a Tg of between −5° C. and −50° C. In the case of butadiene/stirene/isoprene copolymers, those having a stirene content of between 5% and 50% by weight and more particularly of between 10% and 40%, relative to the weight of the copolymer, an isoprene content of between 15% and 60% by weight and more particularly of between 20% and 50%, relative to the weight of the copolymer, a butadiene content of between 5% and 50% by weight and more particularly of between 20% and 40%, relative to the weight of the copolymer, a content (mol %) of 1,2-units of the butadiene part of between 4% and 85%, a content (mol %) of trans-1,4-units of the butadiene part of between 6% and 80%, a content (mol %) of 1,2- plus 3,4-units of the isoprene part of between 5% and 70% and a content (mol %) of trans-1,4-units of the isoprene part of between 10% and 50%, and more generally any butadiene/stirene/isoprene copolymer having a Tg of between −5° C. and −70° C., are especially suitable. The content of stirene, butadiene, and isoprene by weight, the molar content of the 1,2-units of the butadiene part, the molar content of the trans-1,4-units of the butadiene part, the molar content of 1,2-units of the isoprene part, the molar content of the 3,4-units of the isoprene part and the content of trans-1,4-units of the isoprene part of the copolymers are measured by techniques well known to those skilled in the art.

According to a particular embodiment of the invention, the rubber composition may comprise for example from 50 to 100 phr of a first diene elastomer and from 0 to 50 phr of a second diene elastomer different from the first diene elastomer.

The diene elastomer(s) of the composition according to the invention may be selected preferentially from the group of highly unsaturated diene elastomers consisting of polybutadienes (abbreviated to BRs), synthetic polyisoprenes (abbreviated to IRs), natural rubber (abbreviated to NR), butadiene copolymers, isoprene copolymers and the mixtures of these elastomers. Such copolymers are more preferentially selected from the group consisting of butadiene/stirene copolymers (abbreviated to SBRs), isoprene/butadiene copolymers (abbreviated to BIRs), isoprene/stirene copolymers (abbreviated to SIRs), ethylene/butadiene copolymers and isoprene/butadiene/stirene copolymers (abbreviated to SBIRs).

The composition according to the invention may contain just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Preferably, the composition according to the invention may comprise just one elastomer selected from the group consisting of polybutadienes, synthetic polyisoprenes, natural rubber, butadiene/stirene copolymers, isoprene/butadiene copolymers, isoprene/stirene copolymers, isoprene/butadiene/stirene copolymers, ethylene/butadiene copolymers and mixtures of these elastomers; preferably, the elastomer is a butadiene/stirene copolymer.

III.2 Reinforcing Filler and Coupling Agent

"Reinforcing filler" is intended in a known way to mean a filler known for its abilities to reinforce a rubber composition which can be used for the manufacture of tires.

Among these reinforcing fillers are organic fillers, such as carbon black, and inorganic fillers.

The term "reinforcing inorganic filler" should be understood here to mean, in a known way, any inorganic or mineral filler, irrespective of its colour and its origin (natural or synthetic), also known as "white filler", "clear filler" or else "non-black filler", in contrast to carbon black, this inorganic filler being capable of reinforcing, by itself, without means other than an intermediate coupling agent, a rubber composition intended for the manufacture of a semi-finished article for a tire, in other words capable of replacing, in its reinforcing role, a conventional tire-grade carbon black for a semi-finished article, especially a tread. Such a filler is generally characterized by the presence of functional groups, especially hydroxyl (—OH) functional groups, at its surface, requiring in that regard the use of a coupling agent or system intended to provide a stable chemical bond between the elastomer and said filler.

The composition according to the invention comprises, as reinforcing inorganic filler, a silica in the form of essentially spherical nanoparticles, the BET specific surface area of this silica ranging from 30 $m^2/g$ to 250 $m^2/g$.

The term "nanoparticles" used in the present application must be understood in its usual, generic sense, of aggregate on the nanometre scale (also referred to as "secondary particle"), and not in the sense of individual particles (also referred to as "primary particles"), which may optionally form, where appropriate, part of this aggregate. "Aggregate" must be understood, in a known way, to mean the indivisible assembly (i.e. that which cannot be cut, divided, or split) which is produced during the synthesis of the filler, generally in the form of individual (primary) particles aggregated together.

The silica nanoparticles used in the compositions of the invention are essentially spherical. "Essentially spherical" is intended to mean that the nanoparticles resemble spheres or indeed are spheres. A nanoparticle is deemed to resemble a sphere when it has a sphericity index of greater than or equal to 0.80, preferably ranging from 0.80 to 0.99, even more preferably ranging from 0.85 to 0.99. The sphericity index is measured according to the method described in paragraph I.1.2.

Advantageously, the silica in the form of essentially spherical nanoparticles may have a BET specific surface area ranging from 30 $m^2/g$ to 150 $m^2/g$, preferably ranging from 30 $m^2/g$ to 120 $m^2/g$, even more preferably from 30 $m^2/g$ to 100 $m^2/g$. The BET specific surface area is measured according to the protocol described in paragraph I.1.1.

The essentially spherical nanoparticles are nanoparticles of amorphous silica. These nanoparticles are dense, i.e. relatively non-porous or even non-porous. Compared to the silica particles obtained by precipitation, the silica nanoparticles used in the compositions of the invention are essentially spherical. They are especially relatively unstructured.

The dispersion of the silica in the form of essentially spherical nanoparticles in the elastomer matrix is advantageously comparable to that obtained for silicas referred to as "highly dispersible". The dispersion of this silica in the elastomer matrix of the composition of the invention has, in particular, a Z score of greater than or equal to 80. This score is measured according to the method described in paragraph I.1.5.

According to one embodiment, the median size by weight ($d_{50}$) of the essentially spherical silica nanoparticles may be less than or equal to 100 nm; it preferably ranges from 10 to 80 nm, even more preferably from 20 to 70 nm. This median size of the nanoparticles corresponds to the size for which 50% by weight of the aggregates (nanoparticles) are smaller than this size and 50% by weight of the aggregates (nanoparticles) are larger than this size. The median size $d_{50}$ is measured according to the method described in paragraph I.1.3.

The number of silanol groups per $nm^2$ ($N_{SiOH/nm^2}$) of the silica in the form of essentially spherical nanoparticles may be greater than or equal to 4; it may preferably range from 4 to 12, it may more preferably range from 5 to 10. The number of silanol groups per $nm^2$ is measured according to the method described in paragraph I.1.4.

The silica in the form of essentially spherical nanoparticles is well known to those skilled in the art and may be obtained especially by processes such as, for example, what is referred to as the Stoeber process (W. Stoeber, A. Fink, E. Bohm, J. colloid Inter. Sci 26,62-69 (1968)) or else by fusion processes, especially electric arc fusion. The silica obtained by electric arc fusion processes is also referred to as fused silica.

Preferably, the silica in the form of essentially spherical nanoparticles may be a fused silica.

Fused silica is a synthetic amorphous silica, not to be confused with fused quartz or vitreous silica, or with fumed silicas. Vitreous silica is obtained by heating crystallized silica beyond its melting point and by cooling it rapidly to avoid recrystallization. Fumed silicas are obtained by vaporizing silica at high temperature in the presence of a reducing agent such as charcoal or else by burning silicon tetrachloride in the presence of hydrochloric acid and methane or hydrogen. Fused silica, for its part, is obtained by electric arc or else by plasma fusion, that is to say by spraying high-purity amorphous silica powder at a high temperature of at least 1750° C. in the presence of gaseous oxygen and air and by keeping this temperature above the melting point of the silica so that the silica melts. Fused silica has a high level of purity, which may comprise more than 99% by weight of two elements: Si and O. Fused silica has relatively few impurities, unlike silicas obtained by fuming. By way of example, for a fused silica, the content of ferrous ions $Fe^{2+}$ is less than 20 ppm (ppm=parts per million), the content of chloride ions $Cl^-$ is less than 1 ppm, as is the content of sodium ions $Na^+$. Those skilled in the art may refer to the paragraph "fused silica" in the Kirk-Othmer Encyclopedia of Chemical Technology, Fourth Edition Vol. 21 p1027-1028, for further information.

The silicas in the form of essentially spherical nanoparticles are especially commercially available for example from the supplier Denki Kagaku Kogyo Kabushiki (DENKA). For example, the silicas UFP-40 and UFP-30 sold by DENKA in the form of an "ultra-fine" powder are especially suitable as silica used within the context of the invention.

The content of silica in the form of essentially spherical nanoparticles in the composition of the invention ranges from 60 to 250 phr, preferably from 80 to 200 phr. Of course, those skilled in the art know to apply the necessary content of silica in the form of essentially spherical nanoparticles as a function of the targeted applications for the rubber composition.

According to one embodiment, the reinforcing filler may consist of silica in the form of essentially spherical nanoparticles.

According to another embodiment, the predominant reinforcing filler may be the silica in the form of essentially spherical nanoparticles, that is to say that the weight of said silica represents at least 51% of the total weight of the reinforcing filler. Preferably, the weight of this silica may represent more than 60%, preferably more than 90% by weight of the total weight of the reinforcing filler; the remainder of the reinforcing filler consisting of carbon black or else of at least one other reinforcing inorganic filler different from the silica in the form of essentially spherical nanoparticles, or else of a mixture of carbon black and of said reinforcing inorganic filler.

Preferentially, when the composition comprises a mixture of reinforcing inorganic fillers, the other reinforcing inorganic filler may be a filler of the siliceous or aluminous type, or a mixture of these two types of fillers.

The other reinforcing inorganic filler of siliceous type may be any reinforcing silica known to those skilled in the art, especially any precipitated or fumed silica having a BET surface area and a CTAB specific surface area both of less than 450 m²/g, preferably from 30 to 400 m²/g. Highly dispersible precipitated silicas (HDSs) are preferred, in particular when the invention is employed in the manufacture of tires having a low rolling resistance; mention may be made, as examples of such silicas, of the Ultrasil 7000 silicas from Evonik, the Zeosil 1165MP, 1135MP and 1115MP silicas from Solvay, the Hi-Sil EZ150G silica from PPG, the Zeopol 8715, 8745 and 8755 silicas from Huber or the silicas as described in the abovementioned Application WO 03/016837.

Another reinforcing inorganic filler may be a reinforcing alumina ($Al_2O_3$); preferentially a highly dispersible alumina having a BET specific surface ranging from 30 to 400 m²/g, more preferably between 60 and 250 m²/g, and a mean particle size at most equal to 500 nm, more preferably at most equal to 200 nm. Mention may especially be made, as non-limiting examples of such reinforcing aluminas, of the Baikalox A125 or CR125 alumina (Baïkowski), APA-100RDX alumina (Condea), Aluminoxid C alumina (Evonik) or AKP-G015 alumina (Sumitomo Chemicals).

By way of other examples of inorganic filler able to be used in the rubber compositions of the invention, the following may also be mentioned: aluminium (oxide) hydroxides, aluminosilicates, titanium oxides, silicon carbides or nitrides, all of the reinforcing type as described, for example, in Applications WO 99/28376, WO 00/73372, WO 02/053634, WO 2004/003067 and WO 2004/056915.

The physical state in which the other reinforcing inorganic filler is provided is not important, whether it is in the form of a powder, of microbeads, of granules, of beads or any other appropriate densified form. Of course, the term "reinforcing inorganic filler" is also intended to mean mixtures of different reinforcing inorganic fillers, in particular of highly dispersible aluminous fillers and/or siliceous fillers in the form of essentially spherical or non-spherical nanoparticles as described above.

Those skilled in the art will understand that, as filler equivalent to the reinforcing inorganic filler, other than the silica in the form of essentially spherical nanoparticles, described in the present section, a reinforcing filler of another nature, especially organic nature, might be used provided that this reinforcing filler is covered with an inorganic layer, such as silica, or else comprises functional sites, especially hydroxyl sites, at its surface requiring the use of a coupling agent in order to form the bond between the filler and the elastomer.

According to one embodiment, the composition of the invention may further comprise carbon black.

All carbon blacks, especially blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO 2006/069792, WO 2006/069793, WO 2008/003434 and WO 2008/003435.

Those skilled in the art will know how to adjust the content of reinforcing filler according to the nature of the inorganic or organic filler used and according to the type of tire in question, for example tire for a motorbike, for a passenger vehicle or for a utility vehicle, such as a lorry or heavy duty vehicle, etc.

Preferably, the total content of reinforcing filler(s) may range from 60 to 300 phr, more preferentially from 80 to 250 phr. The total content of reinforcing filler(s) corresponds to the sum of the contents of silica in the form of essentially spherical nanoparticles and the other reinforcing organic or inorganic fillers, when present.

The composition of the invention comprises at least one coupling agent which makes it possible to bond the reinforcing inorganic filler to the diene elastomer.

It is possible to use, in a known way, an agent for coupling (or agent for bonding) organosilanes, especially alkoxysi- lane polysulfides or mercaptosilanes or else at least bifunctional polyorganosiloxanes. These coupling agents are intended to ensure a sufficient connection, of chemical and/or physical nature, between the inorganic filler (surface of its particles) and the diene elastomer.

The organosilanes may especially be silane polysulfides, referred to as "symmetrical" or "asymmetrical" depending on their specific structure, such as described, for example, in applications WO 03/002648 (or US 2005/016651) and WO 03/002649 (or US 2005/016650).

Suitable in particular, without the definition below being limiting, are silane polysulfides referred to as "symmetrical", corresponding to the following general formula (II):

in which:
x is an integer from 2 to 8 (preferably from 2 to 5);
the A symbols, which are identical or different, represent a divalent hydrocarbon-based radical (preferably $C_1$-$C_{18}$ alkylene groups or $C_6$-$C_{12}$ arylene groups, more particularly $C_1$-$C_{10}$, especially $C_1$-$C_4$, alkylene groups, in particular propylene);
the Z symbols, which are identical or different, correspond to one of the formulae below:
in which:

the $R^1$ radicals, which are substituted or unsubstituted and identical to or different from one another, represent a $C_1$-$C_{18}$ alkyl, a $C_5$-$C_{18}$ cycloalkyl or a $C_6$-$C_{18}$ aryl (preferably a $C_1$-$C_6$ alkyl, a cyclohexyl or a phenyl, especially a $C_1$-$C_4$ alkyl, more particularly methyl and/or ethyl), the $R^2$ radicals, which are substituted or unsubstituted and identical to or different from one another, represent a $C_1$-$C_{18}$ alkoxyl or a $C_5$-$C_{18}$ cycloalkoxyl group (preferably a group selected from $C_1$-$C_8$ alkoxyls and $C_5$-$C_8$ cycloalkoxyls, more preferentially still a group selected from $C_1$-$C_4$ alkoxyls, in particular methoxyl and ethoxyl).

In the case of a mixture of alkoxysilane polysulfides corresponding to the above formula (II), especially normal commercially available mixtures, the mean value of the "x" indices is a fractional number preferably of between 2 and 5, more preferentially of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (especially disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)3S]_2$. Mention will also be made, as preferential examples, of bis(mono($C_1$-$C_4$)alkoxyldi($C_1$-$C_4$)alkylsilylpropyl) polysulfides (especially disulfides, trisulfides or tetrasulfides), more particularly bis(monoethoxydimethylsilylpropyl) tetrasulfide, such as described in Patent Application WO 02/083782 (or US 2004/132880).

Mention will especially be made, as coupling agent other than an alkoxysilane polysulfide, of bifunctional POSs (polyorganosiloxanes) or else of hydroxysilane polysulfides ($R^2$=OH in the above formula II), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

Mention will be made, as examples of other silane sulfides, for example, of silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815 and WO 2007/098080.

Of course, use might also be made of mixtures of the coupling agents described above, such as, for example, the mixtures mentioned in the abovementioned application WO 2006/125534.

The content of coupling agent may advantageously be less than 20 phr. Typically, the content of coupling agent may preferably represent from 0.3 to 15 phr. This content may be readily adjusted by those skilled in the art as a function of the content of reinforcing inorganic filler used in the composition.

The rubber composition according to the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

III.3 Plasticizing Agent

The composition according to the invention may also comprise at least one plasticizing agent. The plasticizing agent may be selected from plasticizing resins having a glass transition temperature (Tg) of greater than 20° C., plasticizers that are liquid at room temperature (23° C.), and mixtures thereof. For example, the plasticizing agent may be a plasticizing system composed of at least one plasticizing resin having a glass transition temperature (Tg) of greater than 20° C. and of at least one plasticizer that is liquid at room temperature (23° C.).

The content of plasticizing agent in the composition may range from 10 to 220 phr and preferably may range from 20 to 180 phr.

III.3.1. Resin

In a manner known to those skilled in the art, the name "plasticizing resin" is reserved in the present application, by definition, for a compound which is, on the one hand, solid at room temperature (23° C.) (in contrast to a liquid plasticizing compound, such as an oil) and, on the other hand, compatible (that is to say, miscible at the content used, typically of greater than 5 phr) with the rubber composition for which it is intended, so as to act as a true diluting agent.

Hydrocarbon-based resins are polymers well known to those skilled in the art which are miscible by nature in diene elastomer composition(s), when they are additionally classed as "plasticizing". They have been described, for example, in the work entitled "*Hydrocarbon Resins*" by R.

Mildenberg, M. Zander and G. Collin (New York, VCH, 1997, ISBN 3-527-28617-9), Chapter 5 of which is devoted to their applications, especially in the tire rubber field (5.5. "*Rubber Tires and Mechanical Goods*").

Preferably, the hydrocarbon-based plasticizing resin has at least any one of the following characteristics:
- a Tg of greater than 20° C., more preferentially of greater than 30° C.;
- a number-average molecular weight (Mn) of between 400 and 2000 g/mol, more preferentially between 500 and 1500 g/mol;
- a polydispersity index (PI) of less than 3, more preferentially of less than 2 (as a reminder: PI=Mw/Mn, with Mw the weight-average molecular weight).

More preferentially, this hydrocarbon-based plasticizing resin has all of the above preferential features.

The glass transition temperature, Tg, is measured in a known way by DSC (Differential Scanning Calorimetry) according to standard ASTM D3418 (1999). The macrostructure (Mw, Mn and PI) of the hydrocarbon-based resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The plasticizing resins may be aliphatic or aromatic or else of the aliphatic/aromatic type, that is to say based on aliphatic and/or aromatic monomers. They can be natural or synthetic, based or not based on petroleum (if such is the case, also known under the name of petroleum resins).

According to a particularly preferential embodiment, the hydrocarbon-based plasticizing resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins and the mixtures of these resins, especially the mixture of $C_5$ fraction homopolymer or copolymer resins and $C_9$ fraction homopolymer or copolymer resins.

Use is preferentially made, among the above copolymer resins, of those selected from the group consisting of CPD/vinylaromatic copolymer resins, DCPD/vinylaromatic copolymer resins, CPD/terpene copolymer resins, DCPD/terpene copolymer resins, CPD/$C_5$ fraction copolymer resins, DCPD/$C_5$ fraction copolymer resins, terpene/vinylaromatic copolymer resins, $C_5$ fraction/vinylaromatic copolymer resins, and the mixtures of these resins.

The term "terpene" includes here, as is known, α-pinene, β-pinene and limonene monomers; use is preferentially made of a limonene monomer, a compound which, as is known, is in the form of three possible isomers: L-limonene (laevorotatory enantiomer), D-limonene (dextrorotatory enantiomer), or else dipentene, the racemate of the dextrorotatory and laevorotatory enantiomers.

Suitable as vinylaromatic monomer are, for example: stirene, α-methylstirene, ortho-, meta- or para-methylstirene, vinyltoluene, para-(tert-butyl)stirene, methoxystirenes, chlorostirenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is stirene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a more particularly preferential embodiment, the hydrocarbon-based plasticizing resin is selected from the group consisting of CPD homopolymer resins, DCPD homopolymer resins, CPD/stirene copolymer resins, DCPD/stirene copolymer resins, polylimonene resins, limonene/stirene copolymer resins, limonene/CPD copolymer resins, limonene/DCPD copolymer resins, $C_5$ fraction/stirene copolymer resins, $C_5$ fraction copolymer resins, $C_9$ fraction copolymer resins and the mixtures of these resins, especially the mixtures of $C_5$ fraction copolymer resins and $C_9$ fraction copolymer resins.

The preferential resins above are well known to those skilled in the art and are commercially available, for example sold as regards:
- polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
- $C_5$ fraction/vinylaromatic copolymer resins, especially $C_5$ fraction/stirene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and ECR 373;
- limonene/stirene copolymer resins: by DRT under the name Dercolyte TS 105 from DRT or by Arizona Chemical Company under the names ZT115LT and ZT5100.

III.3.2. Plasticizing Agent that is Liquid at Room Temperature

The plasticizing agent may be a plasticizer that is liquid at room temperature (23° C.), for example an extending oil (or plasticizing oil) that is liquid at room temperature, the usual role of which is to facilitate the processing, by lowering the Mooney plasticity, and to improve the endurance, by decreasing the cured moduli of elongation.

Any extending oil, whether it is of aromatic or non-aromatic nature, known for its plasticizing properties with regard to diene elastomers may be used. At room temperature (23° C.), these oils, which are more or less viscous, are liquid (that is to say, as a reminder, substances which have the ability to eventually assume the shape of their container), in contrast especially to resins or rubbers, which are by nature solid. Preferably, the plasticizing oil may have the following characteristic: its glass transition temperature Tg is less than 0° C., preferably less than −20° C. The glass transition temperature is measured according to standard ASTM D3418 (1999).

Preferably, the extending oil may be selected from the group consisting of polyolefinic oils (that is to say resulting from the polymerization of olefins, monoolefins or diolefins), paraffinic oils, naphthenic oils (low or high viscosity, especially hydrogenated or not), aromatic oils, MES (Medium Extracted Solvates) oils, TDAE (Treated Distillate Aromatic Extracts) oils, mineral oils, vegetable oils, ether plasticizers, ester plasticizers, phosphate plasticizers, sulfonate plasticizers and the mixtures of these compounds. For example, mention may be made of those which contain between 12 and 30 carbon atoms, for example trioctyl phosphate. Mention may especially be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may especially be made, among the above triesters, of glycerol triesters, preferably predominantly composed (for more than 50%, more preferentially for more than 80%, by weight) of an unsaturated $C_{18}$ fatty acid, that is to say selected from the group consisting of oleic acid, linoleic acid, linolenic acid and the mixtures of these acids. More preferentially, whether it is of synthetic origin or natural origin (case, for example, of sunflower or rapeseed vegetable oils), the fatty acid used is composed, for more than 50% by weight, more preferentially still for more than 80% by weight, of oleic acid. Such triesters (trioleates) having a high content of oleic acid are well known; they have been described, for example, in Application WO 02/088238 as plasticizing agents in tire treads.

Use is preferentially made of a vegetable oil selected from the group consisting of linseed, safflower, soybean, maize, cottonseed, rapeseed, castor, tung, pine, sunflower, palm, olive, coconut, peanut and grapeseed oils, and mixtures of these oils, in particular a sunflower oil. This vegetable oil, particularly sunflower oil, is more preferentially an oil rich in oleic acid, that is to say that the fatty acid (or all of the fatty acids, if several are present) from which it derives comprises oleic acid according to a fraction by weight at least equal to 60%, more preferentially at least equal to 70%, in particular equal to or greater than 80%.

According to one particular embodiment of the invention, the liquid plasticizer is a petroleum oil, preferably a non-aromatic petroleum oil, or a vegetable oil.

A liquid plasticizer is described as non-aromatic when it has a content of polycyclic aromatic compounds, determined with the extract in DMSO according to the IP 346 method, of less than 3%, relative to the total weight of the liquid plasticizer.

To this end, use may be made of a liquid plasticizer selected from the group consisting of MES oils, TDAE oils, naphthenic oils (of low or high viscosity, especially which are hydrogenated or non-hydrogenated), paraffinic oils and mixtures of these oils.

III.3.3. Mixture of Plasticizing Agents

According to one embodiment of the invention, the plasticizing agent may be at least one plasticizing resin as mentioned above, in a mixture with at least one plasticizing agent that is liquid at room temperature, as described above. Reference will then be made to a plasticizing system.

According to one embodiment, the plasticizing system may comprise, according to a content A ranging from 5 to 120 phr, preferably from 10 to 100 phr, of plasticizing resin as described above, and a content B ranging from 5 to 100 phr, preferably from 10 to 80, of plasticizing agent that is liquid at room temperature as described above.

According to one embodiment, the overall content (A+B) of the plasticizing system may range from 10 to 220 phr in the composition according to the invention, preferably from 20 to 180 phr.

Preferably, according to this embodiment, the plasticizing system may comprise:
  at least one plasticizing resin selected from the group consisting of CPD homopolymer resins, DCPD homopolymer resins, CPD/stirene copolymer resins, DCPD/stirene copolymer resins, polylimonene resins, limonene/stirene copolymer resins, limonene/CPD copolymer resins, limonene/DCPD copolymer resins, $C_5$ fraction/stirene copolymer resins, $C_5$ fraction copolymer resins, $C_9$ fraction copolymer resins and the mixtures of these resins, especially the mixtures of $C_5$ fraction copolymer resins and $C_9$ fraction copolymer resins; and
  at least one liquid plasticizing agent which is a petroleum oil or vegetable oil, in particular which is selected from the group consisting of vegetable oils, MES oils, TDAE oils, naphthenic oils (of low or high viscosity, especially hydrogenated or non-hydrogenated), paraffinic oils and the mixtures of these oils.

III.4 Crosslinking System

The composition according to the invention comprises a chemical crosslinking system which enables the formation of covalent bonds between the elastomer chains. The chemical crosslinking system may be a vulcanization system or a system containing one or more peroxide compounds.

According to a first preferred variant, the crosslinking system is a vulcanization system, that is to say a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

Preferably, the vulcanization system comprises sulfur, zinc, especially in the form of zinc oxide, and at least one fatty acid, especially a fatty acid having from 16 to 20 carbon atoms, such as stearic acid.

When sulfur is used, it is used at a preferential content of between 0.5 and 12 phr, in particular between 1 and 10 phr. The primary vulcanization accelerator is used at a preferential content of between 0.5 and 10 phr, more preferentially of between 0.5 and 5 phr.

According to one embodiment of the invention, the chemical crosslinking system is a vulcanization system which comprises sulfur, from 0 to 1 phr of zinc and from 0 to 1 phr of fatty acid, especially a preferably saturated fatty acid comprising from 16 to 20 carbon atoms, such as for example stearic acid.

Preferentially, in the composition as defined above, the chemical crosslinking system is a vulcanization system which comprises sulfur, between 0 and 0.5 phr of zinc and between 0 and 0.5 phr of fatty acid, especially a preferably saturated fatty acid comprising from 16 to 20 carbon atoms, such as for example stearic acid.

Use may be made, as (primary or secondary) accelerator, of any compound capable of acting as accelerator of the vulcanization of diene elastomers in the presence of sulfur, especially accelerators of the thiazole type and their derivatives, and accelerators of thiuram and zinc dithiocarbamate types. These accelerators are, for example, selected from the group consisting of 2-mercaptobenzothiazole disulfide (abbreviated to MBTS), tetrabenzylthiuram disulfide (TBZTD), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), zinc dibenzyldithiocarbamate (ZBEC) and the mixtures of these compounds. Preferably, use is made of a primary accelerator of the sulfenamide type.

According to a second variant, when the chemical crosslinking is carried out using one or more peroxide compounds, the content of said peroxide compound(s) may range from 0.01 to 10 phr. Mention may be made, as peroxide compounds of use as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide.

III.5 Other Additives

The rubber compositions of the tires in accordance with the invention may optionally also comprise all or a portion of the usual additives generally used in elastomer compositions intended for the manufacture of semi-finished products and tires, such as, for example, pigments, protection agents, such as anti-ozone waxes, chemical anti-ozonants or antioxidants, anti-fatigue agents, crosslinking agents other than those mentioned above, reinforcing resins, methylene acceptors (for example, phenolic novolak resin) or methylene donors (for example, HMT or H3M), such as described, for example, in Application WO 02/10269.

Of course, the compositions in accordance with the invention can be used alone or as a blend (i.e., as a mixture) with any other rubber composition of use for the manufacture of semi-finished products and tires.

It is obvious that the invention relates to the rubber compositions described above both in the "raw" or non-crosslinked state (i.e., before curing) and in the "cured" or crosslinked, or else vulcanized, state (i.e., after crosslinking or vulcanization).

The compositions of the invention are well suited for the manufacture of semi-finished and finished products for tires, especially for tires intended to equip motorless vehicles, such as bicycles, or motor vehicles of the passenger vehicle, SUV (Sports Utility Vehicles), two-wheel vehicle (especially motorcycles) or aircraft type, and industrial vehicles chosen from vans, heavy-duty vehicles (that is to say underground trains, buses, heavy road transport vehicles (lorries, tractors, trailers)) or off-road vehicles, such as heavy agricultural or construction plant vehicles, and other transportation or handling vehicles.

III.6 Preparation of the Compositions

The rubber compositions of the invention may be manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated; such phases have been described, for example, in applications EP 0501227, EP 0735088 and EP 0810258.

The first (non-productive) phase is preferably carried out in several thermomechanical steps. During a first step, the elastomer(s) and the reinforcing filler(s), including especially the silica in the form of essentially spherical nanoparticles having a BET specific surface area ranging from 30 $m^2/g$ to 250 $m^2/g$, the combination of plasticizers (and optionally the coupling agents and/or other ingredients except for the vulcanization system), are introduced into an appropriate mixer, such as a customary internal mixer, in one or more successive portions, at a temperature between 20° C. and 100° C. and preferably between 25° C. and 100° C. After a few minutes, preferentially from 0.5 to 2 min, and a rise in the temperature to 90° C. or to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the vulcanization system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a slab, in particular for laboratory characterization, or else extruded, in order to form, for example, a rubber profiled element used in the manufacture of semi-finished articles, in order to obtain products such as a tread. These products can subsequently be used in the manufacture of tires, according to techniques known to a person skilled in the art.

The preferred characteristics of the silica in the form of essentially spherical nanoparticles apply to the process described above.

In particular, the BET specific surface area of this silica may range from 30 to 150 $m^2/g$, even more preferably from 30 to 120 $m^2/g$, better still from 30 to 100 $m^2/g$.

Preferentially, the silica in the form of essentially spherical nanoparticles has a number of silanol groups per $nm^2$ of greater than or equal to 4, preferably ranging from 4 to 12, more preferably ranging from 5 to 10.

Preferentially, the silica in the form of essentially spherical nanoparticles has a sphericity index of greater than or equal to 0.80, preferably ranging from 0.80 to 0.99, more preferably ranging from 0.85 to 0.99.

Preferentially, the silica in the form of essentially spherical nanoparticles may be a fused silica.

Preferentially, the content of silica in the form of essentially spherical nanoparticles may range from 60 to 250 phr, preferably from 80 to 200 phr.

Preferentially, the median size of the essentially spherical silica nanoparticles may be less than or equal to 100 nm; it may preferably range from 10 to 80 nm, even more preferably may range from 20 to 70 nm.

The vulcanization (or curing) is carried out in a known way at a temperature generally between 130° C. and 200° C., under pressure, for a sufficient time which can vary, for example, between 5 and 90 min, especially as a function of the curing temperature, of the vulcanization system adopted, of the kinetics of vulcanization of the composition under consideration or else of the size of the tire.

Preferentially, the vulcanization system comprises sulfur, zinc, especially in the form of zinc oxide, and at least one fatty acid, especially a preferably saturated fatty acid having from 16 to 20 carbon atoms, such as stearic acid.

When sulfur is used, it is used at a preferential content of between 0.5 and 12 phr, in particular between 1 and 10 phr. The primary vulcanization accelerator is used at a preferential content of between 0.5 and 10 phr, more preferentially of between 0.5 and 5 phr.

According to one embodiment of the process, the chemical crosslinking system is a vulcanization system which comprises sulfur, from 0 to 1 phr of zinc and from 0 to 1 phr of fatty acid, especially a preferably saturated fatty acid comprising from 16 to 20 carbon atoms, such as for example stearic acid.

Preferentially, in the process as defined above, the chemical crosslinking system is a vulcanization system which comprises sulfur, between 0 and 0.5 phr of zinc and between 0 and 0.5 phr of fatty acid, especially a preferably saturated fatty acid comprising from 16 to 20 carbon atoms, such as for example stearic acid.

III.7 Semi-Finished Article and Tire

Another subject of the present invention relates to a semi-finished article comprising at least one crosslinkable or crosslinked rubber composition as defined above or able to be obtained by the process described above. A semi-finished product is a rubber product intended for tire manufacture. This may be any type of rubber strip, such as especially treads, crown reinforcement plies (for example working plies, protection plies or hooping plies), carcass reinforcement plies, sidewall plies, bead plies, protector plies, underlayer plies, rubber block plies and other plies providing an interface between the abovementioned regions of the tires. Preferably, the semi-finished article is a tread.

Another subject of the invention is a tire comprising at least one semi-finished article as mentioned above.

The examples which follow illustrate the invention without, however, limiting it.

IV. Exemplary Embodiments of the Invention

The compositions are manufactured for the following tests in the following way: the diene elastomer (SBR copolymer), the reinforcing filler (silica to be tested), the coupling agent and the plasticizers, and then, after kneading for one to two minutes, the various other ingredients, with the exception of the vulcanization system, are introduced in one or more successive portions into an internal mixer which is 70% filled and which has an initial vessel temperature of approximately 50° C. Thermomechanical working (non-productive phase) is then performed in one step (total kneading time equal to approximately 10 min), until a maximum "dropping" temperature of approximately 165° C. is reached.

The mixture thus obtained is recovered and cooled and then the vulcanization system (sulfur and accelerator) is added on an external mixer (homofinisher) at approximately 70° C., everything being mixed (productive phase) for approximately 5 to 10 min.

The compositions thus obtained are subsequently calendered, either in the form of slabs (thickness of 2 to 3 mm) or of thin sheets of rubber, for the measurement of their physical or mechanical properties after curing, or in the form of profiled elements which can be used directly, after cutting and/or assembling to the desired dimensions, for example as semi-finished products for tires, in particular as tire treads.

Test 1

The aim of the following test is to demonstrate the improved properties of a rubber composition in accordance with the invention, compared to compositions not in accordance and which do not comprise silica in the form of essentially spherical nanoparticles as reinforcing filler.

For this purpose, three compositions comprising a diene elastomer (SBR copolymer), a coupling agent and a vulcanization system are compared, each of these compositions being reinforced by a different silica, the characteristics of which are specified below.

Composition T1: control composition, the reinforcing filler of which is a silica obtained by precipitation. It is non-spherical and has a BET specific surface area equal to 35 $m^2/g$.

Composition T2: control composition, the reinforcing filler of which is a silica obtained by fuming. It is essentially spherical and has a BET specific surface area equal to 20 $m^2/g$.

Composition C1: composition according to the invention, the reinforcing filler of which is a silica in the form of essentially spherical nanoparticles. It has a BET specific surface area equal to 40 $m^2/g$.

The formulations of the different compositions are given in table 1. The amounts are expressed in parts per 100 parts by weight of elastomers (phr).

The content of coupling agent and the content of diphenylguanidine are adapted as a function of the nature of the silica. Indeed, the greater the specific surface area of a silica, the larger the number of potential binding sites between the reinforcing filler and the elastomer, and hence the greater the amount of coupling agent required to promote reinforcing filler-elastomer bonds. Those skilled in the art therefore know how to adapt these contents as a function of the nature of the reinforcing filler used.

The fraction by volume of filler is identical for all the compositions.

The silicas were characterized according to the methods described in paragraphs I.1.

TABLE 1

| Compositions | | | |
|---|---|---|---|
| Composition | T1 | T2 | C1 |
| SBR1 (a) | 100 | 100 | 100 |
| Silica (b) | 100 | — | — |
| Silica (c) | — | 100 | — |
| Silica (d) | — | — | 100 |
| Coupling agent (e) | 2 | 1 | 2 |
| Liquid plasticizer (f) | — | — | — |
| Plasticizing resin (g) | 45 | 45 | 45 |
| DPG | 0.4 | 0.2 | 0.4 |
| Black | 5 | 5 | 5 |
| Zinc oxide | 3 | 3 | 3 |
| Stearic acid | 2.5 | 2.5 | 2.5 |
| Antioxidant (h) | 2 | 2 | 2 |
| Accelerator (i) | 2.5 | 2.5 | 2.5 |
| Sulfur | 1 | 1 | 1 |
| Fraction by volume of filler (%) | 23% | 23% | 23% |

(a) SBR with 15% of styrene units; 24% of -1,2-butadiene units; 30% of cis-1,4-butadiene units; 46% of trans-1,4-butadiene units; this SBR has a glass transition temperature Tg equal to −65° C. (Tg measured according to ASTM D3418);
(b) Ultrasil 880 silica from Evonik having a BET specific surface area of 35 $m^2/g$. This is a precipitated silica. Its sphericity index is less than 0.5.
(c) Sidistar R300 silica from Elkem having a BET specific surface area of 20 $m^2/g$. This is a fumed silica. Its sphericity index is greater than 0.8.
(d) UFP-40 silica from Denki Kagaku Kogyo Kabushiki (DENKA) having a BET specific surface area of 40 $m^2/g$, a median size of the nanoparticles of 60 nm, a number of silanol groups per $nm^2$ equal to 8 and a sphericity index of 0.92. This is a fused silica.
(e) Si69 TESPT silane from Evonik;
(f) Flexon 630 TDAE oil from Shell;
(g) Escorez 2173 resin from Exxon; this resin has a Tg of 42° C., (Tg measured according to ASTM D3418);
(h) Santoflex 6PPD antioxidant from Solutia;
(i) Santocure CBS accelerator from Solutia.

The properties measured after curing at 150° C. for 40 min are given in table 2 below.

TABLE 2

| Results | | | |
|---|---|---|---|
| Composition | T1 | T2 | C1 |
| Z score (dispergrader score) (%) | 60 | 61 | 81 |
| Elongation at break (%) | 850 | 700 | 950 |
| Stress at break (MPa) | 11 | 12 | 22 |
| Hysteresis (Tanδ max (8% def)) | 0.12 | 0.12 | 0.12 |

Unexpectedly, the composition C1 according to the invention has a higher Z score than that of compositions T1 and T2. This indicates that the silica in the form of essentially spherical nanoparticles disperses in the elastomer matrix much better than the two other silicas tested.

Moreover, it is noted, surprisingly, that for identical hysteresis properties, the composition C1 according to the invention has very significantly improved properties at break compared to compositions T1 and T2. Indeed, composition C1 according to the invention has a stress at break that is two times higher than that of compositions T1 and T2 while also having an elongation at break that is greater than that measured for compositions T1 and T2.

Test 2

This test aims to demonstrate the improved properties of a rubber composition in accordance with the invention compared to a composition representing a formulation used for the manufacture of a tread intended to provide the tire comprising same with excellent grip and rolling resistance.

For this purpose, the composition C1 according to the invention is compared to a control composition T0 comprising a diene elastomer (SBR copolymer), a coupling agent, a vulcanization system and a reinforcing filler which is a silica obtained by precipitation. This silica is non-spherical and has a BET specific surface area equal to 160 m$^2$/g. It is termed a highly dispersible silica. The control composition T0 is a composition known to represent a good compromise of rolling resistance/wear properties while having very good grip properties.

The formulations of the different compositions are given in table 3. The amounts are expressed in parts per 100 parts by weight of elastomers (phr).

The silicas were characterized according to the methods described in paragraphs I.1.

TABLE 3

| Compositions | | |
|---|---|---|
| Composition | T0 | C1 |
| SBR1 (a) | 100 | 100 |
| Silica (j) | 142 | — |
| Silica (d) | — | 100 |
| Coupling agent (e) | 11.5 | 2 |
| Liquid plasticizer (f) | 30 | — |
| Plasticizing resin (g) | 85 | 45 |
| DPG | 2.3 | 0.4 |
| Carbon black | 5 | 5 |
| Zinc oxide | 3 | 3 |
| Stearic acid | 2.5 | 2.5 |
| Antioxidant (h) | 2 | 2 |
| Accelerator (i) | 2.5 | 2.5 |
| Sulfur | 1 | 1 |
| Fraction by volume of filler (%) | 23 | 23 |

(a) SBR with 15% of stirene units; 24% of -1,2-butadiene units; 30% of cis-1,4-butadiene units; 46% of trans-1,4-butadiene units; this SBR has a glass transition temperature Tg equal to −65° C. (Tg measured according to ASTM D3418);
(j) Zeosil1165MP silica from Solvay having a BET specific surface area of 160 m$^2$/g. This is a precipitated silica. Its sphericity index is less than 0.5.
(d) UFP-40 silica from Denki Kagaku Kogyo Kabushiki (DENKA) having a BET specific surface area of 40 m$^2$/g, a median size of the nanoparticles of 60 nm, a number of silanol groups per nm$^2$ equal to 8 and a sphericity index of 0.92. This is a fused silica.
(e) SI69 TESPT silane from Evonik;
(f) Flexon 630 TDAE oil from Shell;
(g) Escorez 2173 resin from Exxon; this resin has a Tg of 42° C., (Tg measured according to ASTM D3418);
(h) Santoflex 6PPD antioxidant from Solutia;
(i) Santocure CBS accelerator from Solutia.

The properties measured after curing at 150° C. for 40 min are given in table 4 below.

TABLE 4

| | Results | |
|---|---|---|
| Composition | T0 | C1 |
| Z score (dispergrader score) (%) | 86 | 81 |
| Elongation at break (%) | 700 | 950 |
| Stress at break (MPa) | 13 | 22 |
| G* Modulus at 60° C. (MPa) | 0.6 | 0.6 |
| Hysteresis (Tanδ max (8% def)) | 0.3 | 0.12 |

The comparison is made at the same fraction by volume of filler, so as to be able to determine the impact of the filler tested on the properties of the rubber composition. The contents of coupling agent and of diphenylguanidine (DPG) are adapted as a function of the nature of the silica.

Although compositions T0 and C1 differ in terms of several parameters (nature of the silica, amount of silica, diluents and coupling agent), it is beneficial to be able to compare the composition in accordance with the invention, based on silica in the form of essentially spherical nanoparticles, with a composition known to represent a good compromise of rolling resistance/wear properties while having very good grip properties and to observe that the composition in accordance with the invention may be better than this known composition.

The composition C1 according to the invention has the same stiffness as the composition T0 used to represent a tread providing good properties of grip and of rolling resistance to the tire comprising same. The mechanical properties of the composition C1, reflected by an equivalent stiffness to that of composition T0, are a positive indication in terms of good grip properties of a tire equipped with a tread comprising the composition C1.

Entirely surprisingly, it is observed that the composition C1 according to the invention has a Z score equivalent to that of the composition T0. The silica in the form of essentially spherical nanoparticles used in the composition C1 disperses in the elastomer matrix in an equivalent manner to that of a silica referred to as "highly dispersible".

Moreover, the observation of table 4 also shows, surprisingly, that the composition C1 according to the invention has properties at break and hysteresis properties that are very significantly improved relative to composition T0. The improvement in the hysteresis properties and the properties at break is favourable for reducing the rolling resistance of a tire equipped with a tread comprising a composition C1.

In summary, the use of a silica in the form of essentially spherical nanoparticles and having a BET specific surface area of greater than 30 m$^2$/g as reinforcing filler in a rubber composition for tires astonishingly makes it possible to significantly improve the properties at break relative to compositions using another type of reinforcing filler.

Compared to a representative composition used for the manufacture of a tread which has very good grip and rolling resistance, the use of silica in the form of essentially spherical nanoparticles and having a BET specific surface area of greater than 30 m$^2$/g also makes it possible to further improve the rolling resistance and the properties at break, without detrimentally affecting the grip. This result is entirely surprising.

Test 3

The aim of this test is to demonstrate the advantage, in terms of the phenomenon of scorching, of the compositions of the invention having low contents of zinc oxide and of stearic acid relative to control compositions in which the contents of zinc oxide and of stearic acid are also reduced.

For this purpose, the compositions in accordance with the invention C4 to C9 are compared with the control compositions TM4 to TM9. Composition TM4 is a composition representing a formulation used for the manufacture of a tread. Compositions TM5 to TM9 have the same formulation as composition TM4 with the exception of the contents of zinc oxide and of stearic acid, which are gradually reduced or even removed. The contents of zinc oxide and of stearic acid are also reduced in the same way in the compositions in accordance with the invention C5 to C9.

The formulations of the different compositions TM4 to TM9 and C4 to C9 are given in table 5. The amounts are expressed in parts per 100 parts by weight of elastomer (phr).

The phenomenon of scorching is observed via the measurement of the scorch time (T5) according to the method described in paragraph I.2.3. The results are also provided in table 5.

0.28 phr and that of stearic acid down to 0.31 phr, is the same scorch time as that of composition C4. No premature vulcanization is observed for these compositions.

When the contents of zinc oxide and of stearic acid are reduced further (composition C8) or when these two constituents are removed (composition C9), a reduction by 30% of the value of the scorch time is observed. The scorch time obtained for compositions C8 and C9 is not prohibitive for industrial use of these compositions.

Test 4

The aim of this test is to illustrate the improved properties of a tire or of a tread comprising a rubber composition in accordance with the invention, compared with a tire or with a tread having very good properties of grip and rolling resistance. The comparison is made at the same stiffness.

Compositions T0 and C1 from test no. 2 were used in this test as treads for tires comprising a radial carcass. The size of the tires used is 225/45 R17. The treads and the tires comprising these treads are obtained according to processes for tire shaping and building that are well known to those skilled in the art and that are identical in every way for the two treads and the two tires, aside from the rubber compo-

TABLE 5

Compositions and results

| Composition | TM4 | C4 | TM5 | C5 | TM6 | C6 | TM7 | C7 | TM8 | C8 | TM9 | C9 |
|---|---|---|---|---|---|---|---|---|---|---|---|---|
| SBR1 (a) | 100 | 100 | 100 | 100 | 100 | 100 | 100 | 100 | 100 | 100 | 100 | 100 |
| Silica (j) | 140 | — | 140 | — | 140 | — | 140 | — | 140 | — | 140 | — |
| Silica (d) | — | 97 | — | 97 | — | 97 | — | 97 | — | 97 | — | 97 |
| Coupling agent (e) | 11.5 | 2 | 11.5 | 2 | 11.5 | 2 | 11.5 | 2 | 11.5 | 2 | 11.5 | 2 |
| Liquid plasticizer (f) | 60 | — | 60 | — | 60 | — | 60 | — | 60 | — | 60 | — |
| Plasticizing resin (g) | 57 | 45 | 57 | 45 | 57 | 45 | 57 | 45 | 57 | 45 | 57 | 45 |
| DPG | 2.3 | 0.40 | 2.3 | 0.40 | 2.3 | 0.40 | 2.3 | 0.40 | 2.3 | 0.40 | 2.3 | 0.40 |
| Carbon black | 6.5 | 6.5 | 6.5 | 6.5 | 6.5 | 6.5 | 6.5 | 6.5 | 6.5 | 6.5 | 6.5 | 6.5 |
| Zinc oxide | 3.00 | 3.00 | 0.75 | 0.75 | 0.55 | 0.55 | 0.4 | 0.4 | 0.2 | 0.2 | 0 | 0 |
| Stearic acid | 2.50 | 2.50 | 0.63 | 0.63 | 0.47 | 0.47 | 0.3 | 0.3 | 0.15 | 0.15 | 0 | 0 |
| Antioxidant (h) + wax | 3.50 | 3.50 | 3.50 | 3.50 | 3.50 | 3.50 | 3.50 | 3.50 | 3.50 | 3.50 | 3.50 | 3.50 |
| Accelerator (i) | 2.5 | 2.5 | 2.5 | 2.5 | 2.5 | 2.5 | 2.5 | 2.5 | 2.5 | 2.5 | 2.5 | 2.5 |
| Sulfur | 0.9 | 0.9 | 0.9 | 0.9 | 0.9 | 0.9 | 0.9 | 0.9 | 0.9 | 0.9 | 0.9 | 0.9 |
| Fraction by volume of filler (%) | 22.7 | 22.7 | 22.7 | 22.7 | 22.7 | 22.7 | 22.7 | 22.7 | 22.7 | 22.7 | 22.7 | 22.7 |
| T5 in min | 27 | 30 | 10 | 30 | 10 | 30 | 10 | 30 | 9 | 26 | 8 | 20 |

(a) SBR with 15% of styrene units; 24% of-1,2-butadiene units; 30% of cis-1,4-butadiene units; 46% of trans-1,4-butadiene units; this SBR has a glass transition temperature Tg equal to −65° C. (Tg measured according to ASTM D3418);
(j) Zeosil1165MP silica from Solvay having a BET specific surface area of 160 m$^2$/g. This is a precipitated silica. Its sphericity index is less than 0.5.
(d) UFP-40 silica from Denki Kagaku Kogyo Kabushiki (DENKA) having a BET specific surface area of 40 m$^2$/g, a median size of the nanoparticles of 60 nm, a number of silanol groups per nm$^2$ equal to 8 and a sphericity index of 0.92. This is a fused silica.
(e) SI69 TESPT silane from Evonik;
(f) Flexon 630 TDAE oil from Shell;
(g) Escorez 2173 resin from Exxon; this resin has a Tg of 42° C., (Tg measured according to ASTM D3418);
(h) Antioxidant Santoflex 6PPD from Solutia; the weight ratio of wax relative to the antioxidant is 0.75
(i) Santocure CBS accelerator from Solutia.

It is observed that when the contents of zinc oxide and of stearic acid are reduced or removed in the control compositions (TM5 to TM8 or TM9), the scorch time is reduced by 60% of its value relative to the scorch time of a control composition comprising usual amounts of zinc oxide and of stearic acid (control composition T4). Control compositions TM5 to TM9 exhibit premature vulcanization (scorching) and are extremely difficult to work and to process industrially.

On the contrary, and surprisingly, in the compositions of the invention (compositions C5 to C8 or C9), when the contents of zinc oxide and of stearic acid are reduced or removed in the same way as for the control compositions (compositions TM5 to TM8 or TM9), the reduction in the scorch time is very small.

Indeed, the scorch time of compositions C5 to C7, the content of zinc oxide of which has been reduced down to sition composing the treads: composition T0 is used for the tread of the control tire PT0 and composition C1 is used for the tread of the tire in accordance with the invention PC1.

The tires were firstly tested on a machine to determine their rolling resistance, then were fitted to vehicles for grip and wear tests. The combined results are summarized in table no. 6.

TABLE 6

Tire test results

| Tire | PT0 | PC1 |
|---|---|---|
| Rolling resistance | 100 | 140 |
| Dry grip | 100 | 100 |
| Wear | 100 | 95 |

On reading table 6, it is observed, surprisingly, that tire PC1 in accordance with the present invention has a very significantly improved rolling resistance (40% better than that of the control tire) while retaining a wear resistance that is comparable to that of tire PT0 used as control, and has equivalent dry grip to that of the control tire. Control tire PT0 is known to have a good compromise of rolling resistance/wear/dry grip properties. This example therefore very clearly illustrates the advantage of the present invention in affording an improved compromise of tire performance properties.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A rubber composition based on one or more diene elastomer(s), on at least one reinforcing filler, on at least one coupling agent, on at least one chemical crosslinking system, wherein the reinforcing filler comprises fused silica in the form of essentially spherical nanoparticles, the BET specific surface area of the silica ranging from 30 m$^2$/g to 250 m$^2$/g.

2. The composition according to claim 1, wherein the fused silica in the form of essentially spherical nanoparticles has a number of silanol groups per nm$^2$ of greater than or equal to 4.

3. The composition according to claim 1, wherein the fused silica in the form of essentially spherical nanoparticles has a sphericity index of greater than or equal to 0.80.

4. The composition according to claim 1, wherein the content of the fused silica in the form of essentially spherical nanoparticles ranges from 60 to 250 phr.

5. The composition according to claim 1, wherein the diene elastomer(s) is (are) selected from essentially unsaturated diene elastomers.

6. The composition according to claim 1, wherein the diene elastomer(s) is (are) selected from natural rubber, synthetic polyisoprenes, polybutadienes, butadiene copolymers, isoprene copolymers and the mixtures of these elastomers.

7. The composition according to claim 1, comprising from 50 to 100 phr of a first diene elastomer and from 0 to 50 phr of a second diene elastomer different from the first diene elastomer.

8. The composition according to claim 1, wherein the fused silica in the form of essentially spherical nanoparticles is the predominant reinforcing filler.

9. The composition according to claim 1, wherein the composition further comprises carbon black.

10. The composition according to claim 1, wherein the total content of reinforcing filler(s) ranges from 60 to 300 phr.

11. The composition according to claim 1, comprising from 10 to 220 phr of plasticizing agent selected from plasticizing resins having a glass transition temperature of greater than 20° C., plasticizers that are liquid at room temperature and mixtures thereof.

12. The composition according to claim 1, wherein the chemical crosslinking system is a vulcanization system which comprises sulfur, from 0 to 1 phr of zinc and from 0 to 1 phr of fatty acid.

13. The composition according to claim 1, wherein the chemical crosslinking system is a vulcanization system which comprises sulfur, between 0 and 0.5 phr of zinc and between 0 and 0.5 phr of fatty acid.

14. The composition according to claim 1, wherein the fused silica in the form of essentially spherical nanoparticles has a median size by weight ($d_{50}$) of less than or equal to 100 nm.

15. The composition according to claim 1, wherein the fused silica in the form of essentially spherical nanoparticles has a Z score of greater than or equal to 80.

16. The composition according to claim 1, wherein the weight of the fused silica in the form of essentially spherical nanoparticles represents more than 60% of the total weight of reinforcing filler.

17. The composition according to claim 16, wherein the reinforcing filler consists of fused silica in the form of essentially spherical nanoparticles.

18. A process for preparing a rubber composition comprising at least the following steps:
   incorporating, in the diene elastomer(s), during a first step, at least one reinforcing filler and at least one coupling agent, everything being kneaded thermomechanically, once or several times, until a maximum temperature of between 110° C. and 190° C. is reached, said reinforcing filler comprising a fused silica in the form of essentially spherical nanoparticles, the BET specific surface area of this silica ranging from 30 m$^2$/g to 250 m$^2$/g; and
   subsequently incorporating, during a second step, a crosslinking system and kneading everything up to a maximum temperature of less than 110° C.

19. A semi-finished rubber article for a tire, comprising at least one crosslinkable or crosslinked rubber composition defined according to claim 1.

20. An article according to claim 19, wherein the article is a tread.

21. A tire that comprises at least one semi-finished article defined according to claim 19.

* * * * *